United States Patent
Vasnier et al.

(10) Patent No.: US 6,504,932 B1
(45) Date of Patent: Jan. 7, 2003

(54) METHOD OF TRANSFERRING INFORMATION BETWEEN A SUBSCRIBER IDENTIFICATION MODULE AND A RADIOCOMMUNICATION MOBILE TERMINAL, AND A CORRESPONDING SUBSCRIBER IDENTIFICATION MODULE AND MOBILE TERMINAL

(75) Inventors: Frédéric Vasnier, Colombes (FR); Anne-Gaëlle Lelong-Gilbert, Viroflay (FR); Pascal Hubbe, Paris (FR); Christophe Choquet, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/236,068

(22) Filed: Jan. 25, 1999

(30) Foreign Application Priority Data

Jan. 26, 1998  (FR) .............................. 98 00771

(51) Int. Cl.⁷ .............................. H04L 9/00; H04L 9/06
(52) U.S. Cl. ........................ 380/273; 713/172; 380/277
(58) Field of Search ................... 380/268, 270, 380/37, 30–31, 42, 273, 247; 713/172, 262, 277

(56) References Cited

U.S. PATENT DOCUMENTS

| | | | | | |
|---|---|---|---|---|---|
| 5,012,074 A | * | 4/1991 | Masada | ...................... | 235/379 |
| 5,020,105 A | * | 5/1991 | Rosen et al. | ................... | 380/30 |
| 5,301,234 A | * | 4/1994 | Mazziotto et al. | ........... | 380/247 |
| 5,384,847 A | * | 1/1995 | Hendrickson et al. | ...... | 380/247 |
| 5,748,720 A | * | 5/1998 | Loder | ......................... | 455/406 |
| 5,915,021 A | * | 6/1999 | Herlin et al. | .................. | 705/67 |
| 5,991,639 A | * | 11/1999 | Rautiola et al. | ............. | 455/553 |
| 6,029,066 A | * | 2/2000 | Despres et al. | ............. | 455/419 |
| 6,081,600 A | * | 6/2000 | Blanchard et al. | .......... | 380/255 |
| 6,097,817 A | * | 8/2000 | Bilgic et al. | ................. | 380/270 |
| 6,230,002 B1 | * | 5/2001 | Floden et al. | ............... | 455/411 |

FOREIGN PATENT DOCUMENTS

| | | |
|---|---|---|
| DE | 19527715 A1 | 2/1997 |
| WO | WO 93/07697 | 4/1993 |

OTHER PUBLICATIONS

Javier Gozalvez Sempere, An overview of the GSM system, 2001 edition, University of Strathclyde Scotland, 1–33.*

* cited by examiner

Primary Examiner—Gilberto Barrón
Assistant Examiner—Kambiz Zand
(74) Attorney, Agent, or Firm—Sughrue Mion, PLLC

(57) ABSTRACT

A method of transferring information between a subscriber identification model and a mobile terminal constituting a station of a radiocommunication system in which at least some of the information transferred between said module and said terminal is protected by encryption. The subscriber identification module and the mobile terminal include encryption means using a key defined at least in part by periodically-varying data specific to the system.

4 Claims, 2 Drawing Sheets

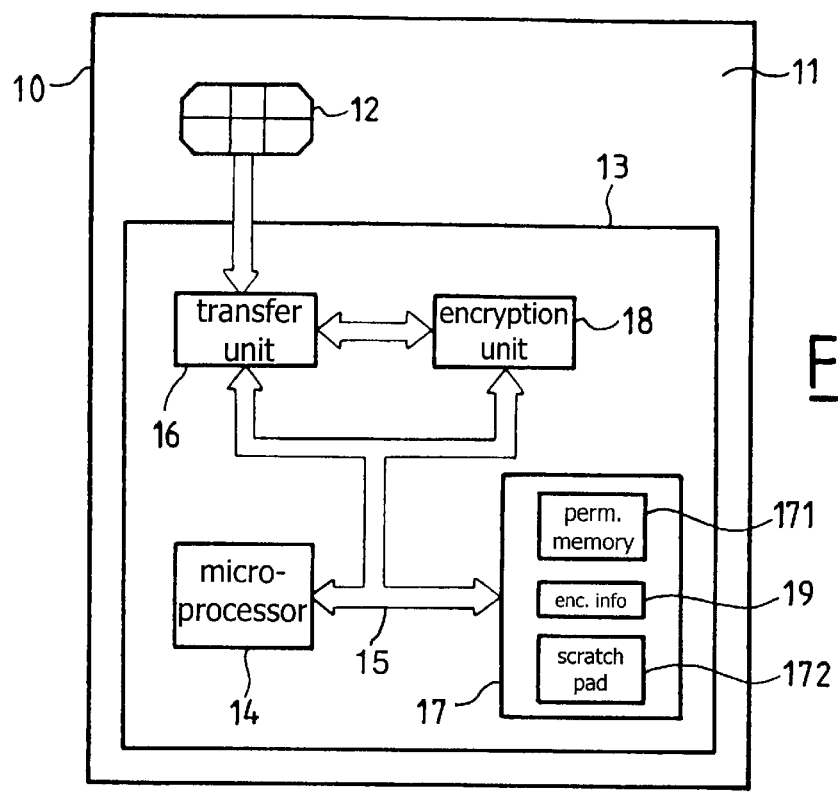
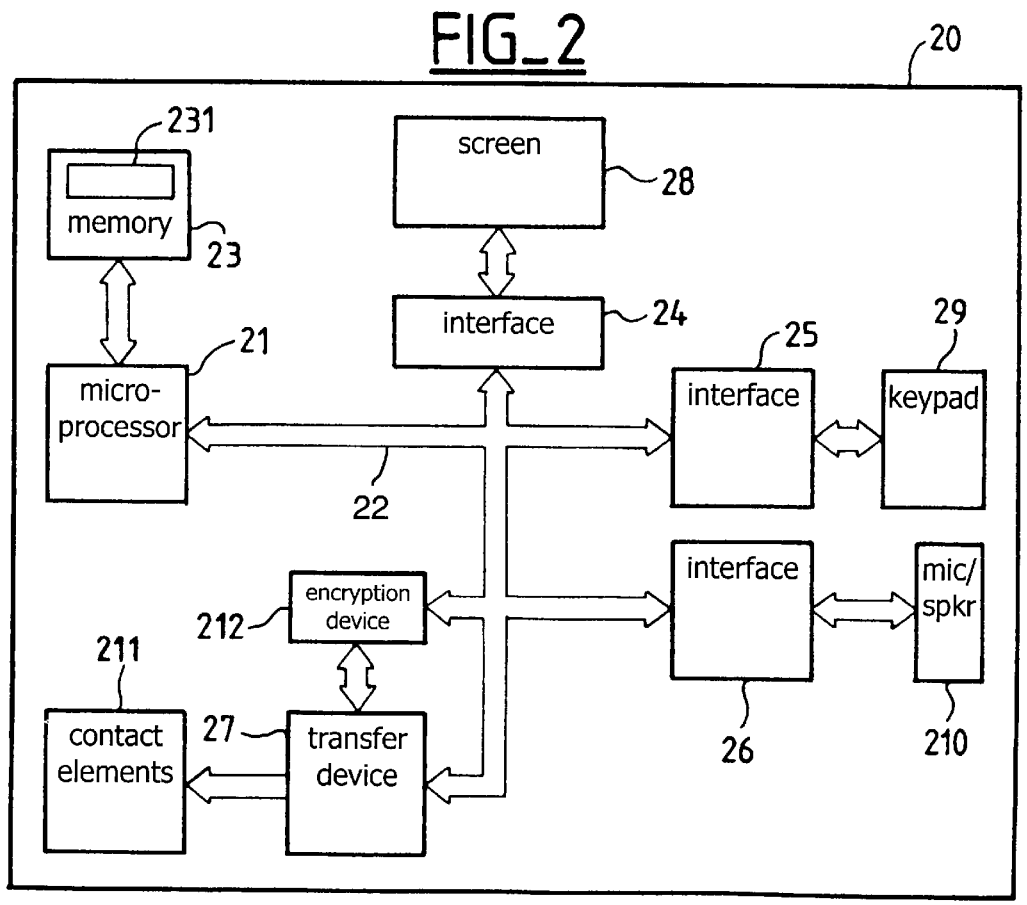

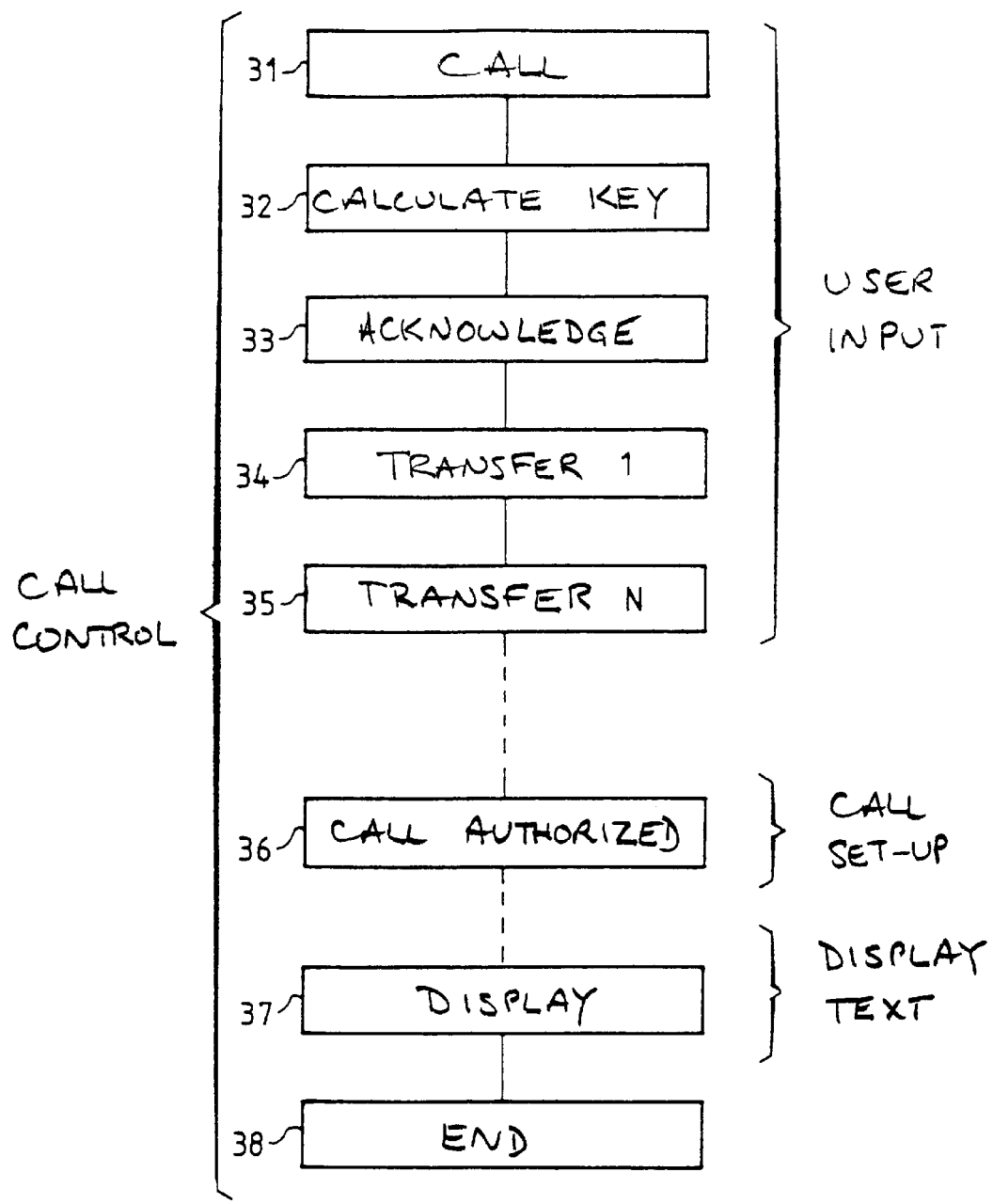
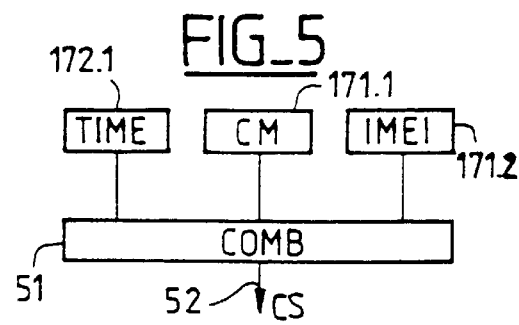

METHOD OF TRANSFERRING INFORMATION BETWEEN A SUBSCRIBER IDENTIFICATION MODULE AND A RADIOCOMMUNICATION MOBILE TERMINAL, AND A CORRESPONDING SUBSCRIBER IDENTIFICATION MODULE AND MOBILE TERMINAL

The field of the invention is that of radio-communication systems and particularly, but not exclusively, systems like the GSM system (Global System for Mobile communications) and the DCS 1800 system (Digital Cellular System).

BACKGROUND OF THE INVENTION

Generally speaking, in a system of the above kind the user communicates via a mobile station consisting of a mobile terminal that co-operates with a subscriber identification module (SIM) usually called a SIM card.

Recommendation GSM 11.11 specifies that data relating to services offered by radiocommunication networks should be stored in memory areas on the SIM card, in like manner to subscriber identification data.

The European Telecommunication Standard (ETS) defines the interface between the subscriber identification module and the mobile terminal.

According to recommendations GSM 11.11 and 11.14, a set of commands is employed relating to use of the SIM card, known as the SIM Application Toolkit and referred to below as the SIM command set.

The SIM command set combines a set of applications and associated procedures that can be used during communication sessions between a mobile terminal and an associated SIM card.

The SIM card is generally a smart card for personalizing the mobile station. It is necessary to personalize the mobile station in the case of portable mobile terminals with a high risk of loss or theft, which can lead to fraudulent misuse.

The solution offered to users to limit the risk of fraudulent misuse is to employ a removable SIM card that the user can remove from the mobile terminal whenever he or she is separated from it. With no SIM card, the mobile terminal offers only a limited number of types of call, in particular calls to emergency services.

However, this measure is not a complete solution to the problem. It is still possible for an unauthorized person in possession of a mobile terminal to simulate the SIM card normally associated with it for the purpose of fraudulent misuse of the mobile terminal, possibly after intercepting messages regularly interchanged between the mobile terminal and the SIM card.

This type of fraudulent misuse has been a particular threat since the introduction of so-called "prepaid" cards. After the (fraudulent) recognition that a station contains a card of this kind, there is no restriction on use of the station because the call time is deemed to be charged to the prepaid account included on the card. The situation is similar in the case of prepaid accounts charged from a prepaid card (the fraud then being the charging of the account).

OBJECTS AND SUMMARY OF THE INVENTION

The present invention aims to propose a solution to the above problem intended to make any kind of fraud so difficult that it becomes improbable.

To this end, the invention therefore consists in a method of transferring information between a subscriber identification module and a mobile terminal constituting a station of a radiocommunication system. In accordance with the invention at least some of the information transferred between said module and said terminal is protected by encryption by means of a key used in said module and in said terminal. The key is defined, at least in part, by periodically-varying data of the system.

In accordance with the invention, the periodically-varying data is a clock function specific to the radio-communication system.

Also, said key is preferably at least partly defined by other data specific to the mobile station.

The data defining said key is preferably combined in said module and in said terminal on the occasion of each transfer of information protected by encryption.

The invention also consists in a mobile terminal and a SIM card respectively adapted to apply said encrypted information transfer method.

BRIEF DESCRIPTION OF THE DRAWINGS

Other features and advantages of the invention become apparent from the following description of an embodiment of the invention given by way of non-limiting example only and with reference to the accompanying drawings, in which:

FIG. 1 is a simplified block diagram of an embodiment of a subscriber identification module in accordance with the invention;

FIG. 2 is a simplified block diagram of an embodiment of a mobile terminal in accordance with the invention and designed to co-operate with the subscriber identification module of FIG. 1;

FIG. 3 is a simplified flowchart of an implementation of an information transfer method of the invention;

FIG. 4 shows a message transferred from a mobile terminal to a subscriber identification module in the context of the method of FIG. 3; and FIG. 5 shows means for obtaining an encryption key in the subscriber identification module of FIG. 1.

MORE DETAILED DESCRIPTION

The following description concerns application of the invention to the specific case of a GSM radiocommunication system. Clearly the skilled person will know how to extend the principles referred to hereinabove not only to the already-mentioned DCS 1800 system, but also to other types of radiocommunication system.

FIG. 1 is a general block diagram of an embodiment of a SIM card 10 consisting in particular of a support 11 which carries connecting contact areas 12 and a semiconductor chip 13. The latter includes data processing means 14 (typically a microprocessor) connected to a bidirectional bus 15 to which the contact areas 12 are connected, via a transfer unit 16, and a memory 17. An encryption unit 18 is connected to the transfer unit 16 and the memory 17 has an area 19 dedicated to encryption information.

The memory 17 conventionally comprises a permanent memory 171 storing telephone subscription data enabling use of a mobile station incorporating the SIM-card 10 together with programs run by the microprocessor 14. The data can be stored in it by the operator of a radiocommunication network or by a sales representative, and is generally of a permanent nature. However, some data can be modified by special action of the microprocessor 14 and is therefore of a semi-permanent nature. The memory 17 also includes a scratchpad memory 172 used by the microprocessor to store data from a mobile terminal into which the SIM card 10 is inserted and data resulting from processing carried out by the microprocessor 14, some of which must be transferred to the mobile terminal. The memory area 19 is preferably divided between the permanent memory 171 and the scratchpad memory 172, as described below with reference to FIG. 5.

The general mode of operation of the SIM card, which is initially inactive, consists in a session initialized by the mobile terminal in application of the above-mentioned SIM command set and giving rise to data being transferred via the contact areas 12 and the transfer unit 16 to the microprocessor 14. In response and in conjunction with the memory 17, the microprocessor 14 runs a program taken from the permanent memory 171 causing it to store data supplied by the mobile terminal in the scratchpad memory 172, to process this data, and to extract other data from the permanent memory 171 in order to prepare processing results that are stored in the scratchpad memory 172. In this context, the micro-processor 14 also causes result data prepared in the memory 172 to be transferred via the transfer unit 16 to the mobile terminal. The session finishes and the SIM card becomes inactive again when data transfer (possibly multiple data transfers) has been completed.

In accordance with the invention, the card is adapted, by adding the encryption unit 18 and the encryption information memory area 19, so that the data transfers just mentioned are protected by encryption. The technique of encryption is well known in itself and is not be described here. It requires a key (a confidential encryption data sequence) combined in the encryption unit 18 with data to be transferred to provide a sequence of signals that are unintelligible to anyone other than a person holding the key for conducting the converse decryption operation to reconstitute the original information. The key is generated in the encryption unit 18 by using key information that can be prepared by the microprocessor 14 and communicated to it via the bus 15. This is discussed in the description of the information transfer method of the invention given below with reference to FIG. 3.

FIG. 2 is a general block diagram of an embodiment of a mobile terminal 20 which includes data processing means 21 (typically a microprocessor) associated with a memory 23, the combination controlling the other means of the terminal via a bidirectional bus 22.

The microprocessor 21 controls various interface devices 24 through 26 respectively with a screen 28, a keypad 29 and a microphone/loudspeaker combination 210. In particular, it controls a transfer device 27 associated with contact elements 211 that come into contact with the contact areas of a SIM card inserted into the terminal. Additionally, in accordance with the invention, an encryption device 212 is connected to the transfer device 27 and the memory 23 includes a location 231 dedicated to encryption information.

The operation of the mobile terminal 20 is not described here as it would exceed the scope of the present invention. Suffice it to say that the mobile terminal uses information stored on the SIM card. The microprocessor 21 of the mobile terminal initializes a session, in application of the above-mentioned SIM command set, and giving rise to transfers of data in both directions via the transfer device 27 and the contact elements 211, in the context defined in the description relating to FIG. 1.

In accordance with the invention and as already mentioned, the mobile terminal is adapted, by adding the encryption device 212 and the encryption information memory location 231, to protect the data transfers by encryption.

FIG. 3 shows an embodiment of the invention in a method of transferring information between a subscriber identification module such as the SIM card from FIG. 1 and a mobile radiocommunication terminal such as that from FIG. 2.

Consider, for example, a situation in which the user has just pressed keys on the keypad 29 to make an outgoing call. The last key pressed is a confirmation key and causes the terminal to alert the SIM card to check if the call is authorized or not, and in the case of a prepaid card to check whether the remaining credit is sufficient for the call.

In a first step 31, the mobile terminal uses the SIM command set for the purposes of a CALL CONTROL session. This session is made up of several parts. The first part, USER INPUT, begins with a CALL step 31 that includes the SIM card being activated and the mobile terminal sending a message 41 as shown in FIG. 4 to the SIM card (or to be more precise to the microprocessor on the card). The message includes data ST which identifies it as part of a SIM command, data TS which identifies the session type (here USER INPUT), an indication S that identifies it as the first message of a session and, finally, TIME data. The TIME data is information that varies with time and that is specific to the radio-communication system, so there is no need to provide means for creating such data, and all that is required is to read it in the mobile terminal from a device that the terminal already contains for some other purpose; this information is advantageously the time information known as the "GSM clock", which includes elements T1, T2, T3 well known in the GSM system and defined by recommendations 05.02 and 05.10 of the GSM standard. Of course, step 31 also includes reception of this message on the SIM card. This step is completed without encryption, i.e. the encryption device 212 of the mobile terminal and the encryption unit 18 of the SIM card are not active and are not involved in the transfer.

The transfer of the above message leads to a CALCULATE KEY step 32 to calculate an encryption key in the manner shown in FIG. 5. FIG. 5 is more particularly concerned with executing the above calculation on the SIM card but the same calculation is also carried out in the mobile terminal (see below). An area 171.1 of the permanent memory 17 contains a mother key CM. It is specific to the manufacturer or to the operator and is stored at the same time as other telephone subscription data. Another area 171.2 of the memory 17 contains an IMEI (International Mobile Equipment Identity), which is a number specific to the mobile terminal and stored on the card when the subscription is taken out, as previously indicated. Finally, the TIME data is temporarily stored in step 31 in an area 172.1 of the scratchpad memory 172. The above three elements are a combined by a combiner device 51 to produce at 52 a key generator indication CS. The combiner device 51 can be hardwired in the encryption unit 18, the microprocessor sending it the above three elements, or it can be a program executed by the microprocessor 14, which then supplies the CS indication directly to the encryption unit 18.

In parallel with the above, and in a manner that does not need to be described in detail, the same process is carried out in the mobile terminal, locations collectively represented at 231 in the memory 23 containing in the same way the three elements referred to above and means being provided for combining them in accordance with FIG. 5 to yield a key generator indication that is finally available in the encryption device 212.

An ACKNOWLEDGE step 33 then essentially consists in the SIM card transferring to the mobile terminal an acknowledgment signal including an instruction to carry out the encrypted transfer. This simultaneously activates the encryption unit 18 and the encryption device 212 with regard to data transferred both ways via the terminal/SIM card interface on the data transfer card between the transfer unit 16 or the transfer device 27 and the source or destination unit, i.e. the micro-processor 14 or the memory 172 on the SIM card, the microprocessor 21 or the memory 23 in the mobile terminal.

From this point on TRANSFER 1, ..., TRANSFER N steps 34, ..., 35 transfer data in encrypted form. Transfer involving the SIM card, even if it is intercepted at the contact areas 12 or the contact elements 211, can no longer be abused. Nor can it be falsified. The objective of the invention is therefore achieved.

The key generator indications, which are the same on the SIM card and in the mobile terminal, are used in a key generator device such as a reaction type shift register, both in the encryption unit 18 and in the encryption device 212, and produce two identical keys, one used for encryption at the sending end and the other for decryption at the receiving end.

FIG. 3 shows, following on from steps 31 through 35 already described and relating to a USER INPUT data transfer, a CALL SET-UP transfer which is one of the transfers included in the SIM command set, in which a CALL AUTHORIZED step 36 includes the encrypted sending of a message indicating that the call defined by step 31 is authorized. As a result the call in question is sent by the mobile terminal in accordance with the GSM system. In parallel with this a DISPLAY step 37 of a DISPLAY TEXT transfer commands the display on the screen of the mobile terminal of a text corresponding to the call operation in progress. At the end of the session, in an END step 38, the encryption unit 18 and the encryption device 212 are de-activated. The previously-used key is not applicable. The session is closed. Another session must take place on the model of that just described.

Clearly the foregoing description is open to many variants that do not depart from the scope of the invention as defined in the claims. In particular the composition of the key can be different if it includes varying information dependent on the system. Accordingly the IMEI could be replaced with some other number specific to the subscription and available on the SIM card and in the mobile terminal. Other varying system information (distance from base station, transmit level, etc.) could be substituted for the GSM clock. The key generator indication could be used differently, for example the microprocessor on the card and the terminal could assume entire responsibility for encryption, instead of a dedicated unit such as the unit 18 or the device 212. Similarly, the use of a computed key is based on a session of the SIM command set. It is naturally possible, in ways that will be evident to the skilled person, to adopt different bases, either a single transfer or an entire period of activity of the terminal. The examples described above represent only preferred solutions in the intended application.

What is claimed is:

1. A method of transferring information between a subscriber identification module (SIM) and a mobile terminal constituting a station of a radiocommunication system in which at least some of the information transferred between said module, and said terminal is protected by encryption by means of a key used in said module and in said terminal, wherein the key is defined, at least in part, by periodically-varying data of said system.

2. An information transfer method according to claim 1, wherein the periodically-varying data is a clock function specific to the radiocommunication system.

3. An information transfer method according to claim 1, wherein at least one other part of the key is defined by data specific to the mobile station.

4. An information transfer method according to claim 1, wherein the data defining said key is combined in said module and in said terminal on the occasion of each transfer of information protected by encryption.

* * * * *